United States Patent [19]

Wynn

[11] Patent Number: 4,678,648

[45] Date of Patent: Jul. 7, 1987

[54] METHOD AND APPARATUS FOR SELECTIVE ABSORPTION OF HYDROGEN SULPHIDE FROM GAS STREAMS CONTAINING HYDROGEN SULPHIDE AND CARBON DIOXIDE

[75] Inventor: Nicholas P. Wynn, Toronto, Canada

[73] Assignee: Sulzer Canada, Inc., Toronto, Canada

[21] Appl. No.: 828,064

[22] Filed: Feb. 10, 1986

[30] Foreign Application Priority Data

Feb. 22, 1985 [CH] Switzerland .......................... 823/85

[51] Int. Cl.$^4$ ...................... C01B 17/16; C01B 31/20; B01D 47/00; B01F 3/04
[52] U.S. Cl. ................................ 423/228; 261/108; 423/229
[58] Field of Search .............. 423/228, 229; 261/108

[56] References Cited

U.S. PATENT DOCUMENTS

| | | | |
|---|---|---|---|
| 3,466,019 | 9/1969 | Priestly | 261/112 |
| 3,466,151 | 9/1969 | Sicard et al. | 261/112 |
| 3,989,811 | 11/1976 | Hill | 423/229 |
| 4,296,050 | 10/1981 | Meier | 261/112 |

FOREIGN PATENT DOCUMENTS 398503 9/1965 Switzerland .

Primary Examiner—John Doll
Assistant Examiner—Lori S. Freeman
Attorney, Agent, or Firm—Kenyon & Kenyon

[57] ABSTRACT

The process selectively absorbs hydrogen sulphide from gases containing hydrogen sulphide and carbon dioxide by contacting the gas with an aqueous solution of alkanolamine in an absorber column containing a structured packing consisting of a number of corrugated plates arranged parallel to the column axis. The corrugations are angled to the column axis at an angle between 20° and 70° and run in opposite directions on adjacent plates. The structured packing effects a lower absorption of the carbon dioxide in the solvent than Pall rings or sieve trays so that only a small amount of carbon dioxide is co-absorbed with the hydrogen sulphide.

10 Claims, 1 Drawing Figure

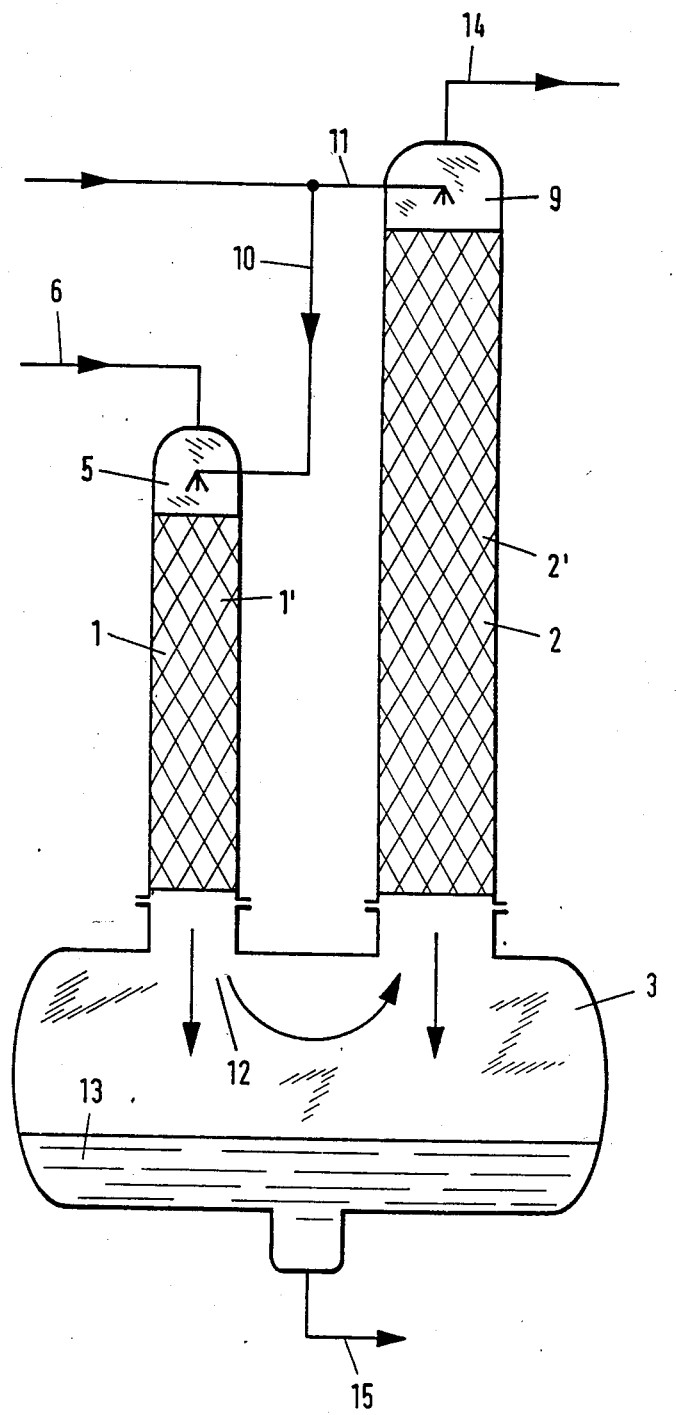

METHOD AND APPARATUS FOR SELECTIVE ABSORPTION OF HYDROGEN SULPHIDE FROM GAS STREAMS CONTAINING HYDROGEN SULPHIDE AND CARBON DIOXIDE

This invention relates to absorption processes. In particular, the invention relates to a method and apparatus for selective absorption of hydrogen sulphide from gases such as sour natural gas, refinery gas, coke oven gas, sour carbon dioxide, Claus plant tail gas or acid gas in which the gas is contacted with a solvent.

As is known, many sources of fuel gas, whether natural or synthetic, contain hydrogen sulphide ($H_2S$). For example, natural gas, refinery gas and coke oven gas can contain $H_2S$ which must be removed before the gas is either burnt or used as a feed to a chemical process.

Since $H_2S$ is both a corrosive and highly toxic substance, removal from the fuel gas should be made as soon as practicable, i.e. from synthetic gas at the gas manufacturing plant and from sour natural gas at a processing facility located near to the gas wells which feed the facility. The $H_2S$ free gas is termed sweet or sweetened gas.

If $H_2S$ is present in large quantities, removal is commonly performed by absorption in an alkaline solvent, most usually by an amine solvent. The $H_2S$ is then desorbed in a suitable desorber by heating the solvent at a lower pressure. The gas coming from the desorber is termed acid gas and is normally processed in a Claus plant where the $H_2S$ is converted to elemental sulfur by sub-stoichiometric combustion with air.

It is common practice to take advantage of the exothermic nature of the Claus process to generate steam. This steam is used in the desorber to strip acid gas from the solvent.

Virtually all fuel gases which contain $H_2S$ also contain carbon dioxide ($CO_2$). Very often, the $CO_2$ is present in larger quantities than the $H_2S$, though this may not always be the case. When such gases are simply scrubbed with an alkaline solution, the $CO_2$ is co-absorbed with the $H_2S$. This is normally desirable. Although not as toxic or as corrosive as $H_2S$, $CO_2$ is a ballast and its presence reduces the heating value of the fuel gas.

Removal of $CO_2$ does bring some disadvantages however, so that in some situations it is preferable not to co-absorb $CO_2$ with $H_2S$.

If the ratio of $CO_2$ to $H_2S$ in the fuel gas is high, then complete removal of both gases will produce an acid gas weak in $H_2S$. This can give difficulties in the Claus plant. The ballast effect of the $CO_2$ reduces the net heat output from the Claus plant and operation is more difficult. In extreme cases, with $H_2S$ content in the acid gas below 10%, normal Claus plant operation is impossible and special measures must be taken to convert the $H_2S$ to elemental sulfur.

Co-absorption also has the disadvantage that additional solvent is required. This additional liquid must be passed through the absorber column, heated, stripped in the desorber and then be cooled and returned to the absorber. The desorber will be larger and require more steam, steam which is less likely to be available from a Claus plant burning a weak acid gas.

In addition, the physical size of the Claus plant will be greater. The size of such a plant is determined by the total volume of acid gas treated rather than by the rate of sulfur production.

In some cases, these problems outweigh any advantage in removing $CO_2$ from the fuel gas and a selective technique is required to remove $H_2S$ alone.

In other cases, it may be essential to remove both $H_2S$ and $CO_2$ from the fuel gas but the resulting acid gas is too weak to process in a Claus plant. A selective absorption technique can then be used to enrich the acid gas. By selectively absorbing $H_2S$ from the acid gas and then stripping the rich solvent, two gas streams are produced.

The gas passing through the absorber will be sweet $CO_2$. This can be passed to a stack after incineration to convert any traces of $H_2S$ to $SO_2$. The gas leaving the desorber will be enriched acid gas containing mainly $H_2S$ and suitable for processing in a simple and compact Claus plant.

Generation of a sweet $CO_2$ stream by this method can be particularly useful. Unlike the stream containing $CO_2$ leaving a Claus plant, this stream will contain no nitrogen. Such a gas stream can be used most effectively for enhanced oil recovery.

Selective absorption is also used to remove $H_2S$ from naturally occuring sour $CO_2$. This sweetened $CO_2$ can then be used for enhanced oil recovery.

When $CO_2$ is injected into a hydrocarbon formation to enhance recovery it can reappear with the recovered hydrocarbons and it may be economical to re-use it for injection. If the $CO_2$ stream has been contaminated with $H_2S$, selective absorption techniques are employed to sweeten it before re-injection.

A further example of the use of selective absorption is in the processing of Claus plant tail gases for environmental reasons. A typical Claus plant may only recover 95 percent of the sulfur in an acid gas stream. In order to reduce sulfur emissions, a common technique is to convert the sulfur species remaining in the Claus plant tail gas to hydrogen sulfide using hydrogenation and hydrolysis. In the SCOT (Shell Claus Offgas Treatment) process, this hydrogen sulfide is then selectively absorbed from the resulting gas stream. The strip gas from the loaded absorbent is then recycled to the inlet of the Claus plant, facilitating sulfur recoveries in excess of 99 percent. In this case, it is particularly important to minimise co-absorption of $CO_2$ since the gas is at low pressure and $CO_2$ is often present in larger quantities than $H_2S$. This means that only low $H_2S$ solvent loadings can be realized and $CO_2$ co-absorption results in a large increase in solvent rate and therefore the steam rate required for regeneration.

In the majority of gas sweetening applications, it is necessary to remove both $H_2S$ and $CO_2$ and conventional gas sweetening solvents are employed, i.e. amines or alkanolamines.

In the cases described above where $H_2S$ should be absorbed selectively, special techniques are used. A common approach is to employ a physical solvent, e.g. Selexol, rather than the chemical solvents such as MEA, DEA, etc. Some of these physical solvents absorb $H_2S$ preferentially to $CO_2$, e.g. it is claimed that Selexol will absorb eight times more $H_2S$ than $CO_2$ under the same conditions of partial pressure.

The disadvantage of these solvents stems from the absorption mechanism which characterizes them. The equilibria for the physical absorbents is not so much shifted by temperature change as for the chemical absorbents. The desorption of absorbed gases from physical absorbents therefore requires a bigger pressure reduction than is the case with chemical absorbents. This means that for a given duty the effective loading capacity is lower for physical than for chemical absorbents.

In the case of acid gas enrichment, little pressure difference is available between absorber and desorber. Compression of the acid gas would be a very expensive measure to produce significant physical solvent loadings.

An alternative approach is to use one group of chemical solvents, alkanolamines, preferably methyl-diethanolamine (MDEA) and size the absorber so as to minimize co-absorption of $CO_2$. This can be done by minimizing the number of trays in the absorber and, if necessary, increasing the solvent circulation rate. Because $H_2S$ is absorbed faster than $CO_2$ in alkanolamines it is possible using this technique to reduce the amount of $CO_2$ absorbed. Since alkanolamines belong to the group of chemical solvents, it is possible to operate the absorber and desorber at similar pressure levels.

This technique is easily applied but not very efficient. By optimizing the number of absorber trays it may be possible to achieve a separation factor of four to five if MDEA (methyldiethanolamine) is used as solvent. This means, in practice, that large quantities of $CO_2$ will still be co-absorbed if it is desired to leave only ppm of $H_2S$ in the gas leaving the absorber.

Proposals have also been made to use special tray designs for selective absorption duties. For example, U.S. Pat. Nos. 4,278,621 and 4,297,329 describe a sieve tray with low perforated area and consequent high gas velocity. Unfortunately, such trays, though marginally better in performance than conventional sieve trays, have a corresponding higher pressure drop. In order for solvent to pass down a column containing such trays, it is therefore necessary to space the trays farther apart than in a conventional column. This clearly increases the cost of such an absorber for only a marginal gain in performance.

Another proposal, from U.S. Pat. Nos. 4,198,386 and 4,198,387 is to maintain selectivity in the face of varying gas flowrate by splitting the absorption volume required between a plurality of absorption columns and controlling the solvent flow of each of them. Clearly, such a system is complicated and the cost of connecting piping and valves renders the system uneconomic.

U.S. Pat. No. 4,093,701 discloses another method of selectively absorbing $H_2S$. A conventional tray column is split into a number of zones, each one being fed with fresh lean amine solvent from the desorber. Again, a substantial number of additional pipes and valves are required for a marginal improvement in performance.

A technique used in some cases to enhance selectivity is to carry out the absorption process at a low temperature. Reducing temperature has the effect of slowing the rate of $CO_2$ absorption more than the rate of $H_2S$ absorption. This is a practical though expensive procedure. The costs of refrigerating large volumes of gas and solvent feed can be high and recovery of the refrigeration from the sweetened gas and loaded solvent is limited because the absorption process is exothermic.

Accordingly, it is an object of this invention to provide a relatively simple economic process and apparatus for absorbing hydrogen sulphide from a gas containing both hydrogen sulphide and carbon dioxide.

It is another object of the invention to use a more effective chemical absorbent in a hydrogen sulphide absorption process.

It is another object of the invention to enrich acid gas using absorption at low pressure.

It is another object of the invention to remove $H_2S$ from Claus plant tail gas which has been treated to convert the sulfur species to $H_2S$.

It is another object of the invention to avoid the use of refrigeration in absorbing hydrogen sulfide.

It is another object of the invention to achieve the highest possible selectivity with almost complete hydrogen sulphide removal and a minimum of co-absorption of carbon dioxide.

It is another object of the invention to operate a hydrogen sulphide absorption process using compact and inexpensive equipment.

Briefly, the invention provides a process and apparatus for absorbing hydrogen sulphide from a feed gas containing hydrogen sulphide and carbon dioxide.

The process includes the steps of contacting the feed gas with a solvent containing an aqueous solution of alkanolamine in an absorption column containing structured packings each of which includes a plurality of parallel corrugated plates having angularly disposed corrugations disposed in criss-crossing relation to a facing corrugated plate so that the solvent absorbs the hydrogen sulphide, and of thereafter collecting the hydrogen sulphide loaded solvent while removing the hydrogen sulphide depleted gas.

The contact of the feed gas with the solvent may occur in counter-current relation or in co-current relation within the absorption column.

The solvent which is used may be an aqueous solution of methyldiethanolamine in a concentration of between 8 and 60 weight percent.

Further, depending upon the feed gas, the process may be performed at different pressures. For example, where the feed gas is a sour natural gas, contact with the solvent may occur at a pressure between 250 and 1500 psia. Where the feed gas is an acid gas or a Claus plant tail gas, the contact pressure may occur between 12 and 30 psia.

The apparatus may include one or more absorption columns, each of which contains structured packings of the above type.

As an example of an advantageous combination of co-current and countercurrent flow, the apparatus may consist of a pair of absorption columns, each of which contains structured packings of the above type and a vessel connected between the columns to define a sump common to the columns and a gas space above the sump. In addition, suitable means are provided for feeding a feed gas containing hydrogen sulphide and carbon dioxide into a first of the columns while suitable means are provided for feeding the solvent into the first column in order to absorb hydrogen sulphide from the feed gas. In addition, means are provided for feeding the solvent into the second of the two columns in order to absorb hydrogen sulphide from the gas flowing into the second column from the gas space of the vessel connected between the columns.

The invention is based upon the surprising discovery that the rate of carbon dioxide absorption in alkanolamine solutions is much lower when using an absorption column with the known structured packing type described above than is to be expected from experiments with absorption columns using other packings such as Pall ring packings or sieve trays.

These and other objects and advantages of the invention will become more apparent from the following detailed description taken in conjunction with the drawing wherein:

BRIEF DESCRIPTION OF THE DRAWING

The FIGURE illustrates a schematic of an apparatus used to carry out a process in accordance with the invention.

As noted above, the surprising discovery that the rate of carbon dioxide absorption in alkanolamine solutions is much lower in an absorption column with a known structured packing is demonstrated by the following examples.

Table 1 shows test results for the absorption of hydrogen sulphide and carbon dioxide in 2 molar methlydiethanolamine solution. 18,000 standard cubic feet per hour (SCFH) of gas at 260 psia were contacted countercurrently with 11 gallons per minute (gpm) of MDEA solution in a 160 millimeter (mm) diameter column packed with an 8 feet deep bed of one inch Pall rings.

TABLE 1

|  | $H_2S$ | $CO_2$ |
|---|---|---|
| feed gas | 1.5% | 17% |
| treated gas | 150 ppm | 6.2% |
| number of transfer units overall gas phase (NTUog) | 4.6 | 1.0 |

The results indicate, as one would expect, that the rate of $CO_2$ absorption is 4 to 5 times lower than the rate of $H_2S$ absorption. Of course, in order to reach an $H_2S$ content of 150 ppm, about seven times more $CO_2$ is absorbed than $H_2S$ because of the higher $CO_2$ content of the feed gas. Stripping the loaded absorbent produces a weak acid gas with 12% hydrogen sulphide.

Tests with a structured packing have given completely unexpected results. The structured packing referred to consists of a number of vertically stacked modules within a column, each one consisting of a plurality of vertical plates with corrugations angled to the column axis and in criss-crossing relationship to the corrugations of an adjacent plate. The angle between the corrugations and the column axis is preferably between 20° and 70°. Alternate modules are stacked with their plates at right angles. Swiss Pat. No. PS 398,503 describes such a packing. The walls of the corrugations can in turn have a fine fluting as described in U.S. Pat. No. 4,296,050.

The term "fluting" as used herein is to be understood as denoting a roughening of the plate surface by grooving or by the impression of a pattern. Other packing types, for example rings, whether stacked or dumped, cannot be used for the process. Such packings do not bring the required selectivity. It may be that the disadvantage of such packings is that the liquid film is interrupted at the contact points between each element, which favors the absorption of carbon dioxide. Absorption columns with sieve trays are also excluded. The packing must produce a continuous falling film of liquid. The packing can be fabricated from different materials such as metal or plastic and in different forms such as sheet, foil or woven. Packings of knitted wire or fleece should not be used since the same problems arise when the liquid film is broken by discontinuities in the packing.

It is well known that the structured packings are generally more efficient at absorbing than Pall rings. For this reason, only five feet of structured packing was used to give similar separation performance as for the Pall ring tests.

Table 2 shows the results of the structured packing tests at the same test conditions as used for Pall rings.

TABLE 2

|  | $H_2S$ | $CO_2$ |
|---|---|---|
| feed gas | 1.5% | 17% |
| treated gas | 108 ppm | 10.5% |
| number of transfer units (NTUog) | 4.9 | 0.48 |

The biggest surprise is that the rate of $CO_2$ absorption is only half that of the first test, despite better $H_2S$ absorption. The calculated number of transfer units shows that $CO_2$ absorption is about ten times slower than the $H_2S$ absorption and that a minor function of the $CO_2$ is absorbed. When stripping the loaded solvent, an acid gas is generated with 20% $H_2S$.

Table 3 shows test results for the absorption of hydrogen sulphide and carbon dioxide in 2.5 molar methyldiethanolamine solution. 530,000 SCFH of gas at 18 psia were contacted countercurrently with 20 gallons per minute (gpm) of MDEA solution in a 300 millimeter (mm) diameter column, containing eleven sieve trays at a spacing of 24 inches.

TABLE 3

|  | $H_2S$ | $CO_2$ |  |
|---|---|---|---|
| feed gas | 10% | 90% | 530,000 SCFH |
| treated gas | 53 ppm | 99.995% | 370,000 SCFH |
| number of transfer units (NTUog) | 7 | 2 | — |

The results indicate, as expected, that the rate of $CO_2$ absorption is roughly 3 times lower than the rate of $H_2S$ absorption. Stripping the loaded solvent will produce a weak acid gas with 25 percent hydrogen sulfide.

Again, tests with a structured packing as described above have given surprisingly better results. A column of 300 mm diameter containing 3.5 m of the structured packing was selected to remove $H_2S$ down to the same levels as achieved in the sieve tray tests.

Table 4 shows the results of the structured packing tests at the same test conditions as used for sieve trays.

TABLE 4

|  | $H_2S$ | $CO_2$ |  |
|---|---|---|---|
| feed gas | 10% | 90% | 530,000 SCFH |
| treated gas | 30 ppm | 99.997% | 430,000 SCFH |
| number of transfer units | 7.7 | 0.6 | — |

Surprisingly, the rate of $CO_2$ absorption is less than one third that when using the sieve tray column under identical conditions, despite better $H_2S$ removal. The calculated number of transfer units shows that the $CO_2$ absorption is over ten times slower than the $H_2S$ absorption. When stripping the loaded solvent, an acid gas is generated with 50 percent $H_2S$.

Similar differences were noted with co-current operation of the packed columns. With structured packing, the $CO_2$ absorption rate is about ten times lower than the $H_2S$ absorption rate. With Pall rings, however, the ratio stays at about four to five.

With co-current absorption it is difficult to remove $H_2S$ to ppm levels. Nevertheless, co-current operation can be very useful to absorb bulk $H_2S$ selectively since the operating parameters can be chosen without any flood limitation. Using higher throughputs, it is possible to reach higher mass transfer rates and thus operate with a shorter and smaller diameter column.

The advantages of both flow patterns can be used to selectively absorb a large quantity of H₂S down to ppm levels from a feed gas containing CO₂.

The following example shows how the process can be used to meet this duty using an apparatus as illustrated in the drawing.

As illustrated, the absorption apparatus includes a pair of absorption columns 1, 2 and a vessel 3 which is connected between the columns 1, 2 and which has a sump 13 common to the columns 1, 2 as well as a gas space 12 above the sump 13 and also common to the columns 1, 2. Both columns 1, 2 are disposed on a vertical axis and each contains a structured packing 1', 2', respectively. In this respect, each structured packing is formed of parallel corrugated plates as described above. In addition, the first absorption column 1 has a smaller diameter than the absorption column 2 so as to provide for a higher gas velocity and mass transfer rate.

As indicated, a means in the form of a pipe 6 is connected to the column 1 so as to feed a feed gas containing hydrogen sulfide and carbon dioxide into a top 5 of the column 1. For example, the feed gas may be a natural gas. In addition, a means in the form of a pipe 10 is also connected to the top of the column 1 in order to feed a solvent containing an aqueous solution of alkanolamine into the column 1 in order to absorb hydrogen sulfide from the feed gas while trickling through the structured packing 1'. The aqueous solution may be methyldiethanolamine (MDEA). As indicated, a means in the form of a branch pipe 11 is also provided for feeding the solvent into a top 9 of the second column 2.

After passing through absorption column 1, the hydrogen sulfide loaded solvent and the gas are separated in the vessel 3. The solvent collects at the bottom of the vessel in a sump 13. The loaded solvent can be withdrawn via a pipe 15. The gas from which a large portion of the hydrogen sulfide has been absorbed, is then contacted counter-currently in absorption column 2 with solvent to remove the remaining hydrogen sulfide. The loaded solvent from this column 2 is also collected in the sump 13. The hydrogen sulfide free gas, still containing a large portion of the original carbon dioxide is discharged via a pipe 14.

A modification to the configuration described above allows more economical operation. If each column is equipped with its own sump and the loaded solvent from the sump of counter-current absorber 2 is fed to co-current absorber 1 then a reduction in solvent rate and higher solvent loading can be achieved.

The configuration described above includes two absorption columns 1, 2. The process can, however, be carried out in a single absorber which is operated either co-currently or counter-currently. The flow pattern is chosen according to the gas purification requirements. Higher H₂S removal can be achieved with counter-current flow in a situation where only a limited supply of alkanolamine is available, or the costs of regenerating the alkanolamine are important. Mass transfer is faster in the case of co-current absorption; however, this flow pattern makes it more difficult to achieve complete hydrogen sulfide removal.

In choosing the parameters of the absorption column, the following factors should be taken into account.

First, for counter-current contact, the column cross-sectional area A in square feet is chosen for a gas flow V in cubic feet per second and a gas density in pounds per cubic foot such that the gas loading factor G is between 0.25 and 3.3 where $$G = \frac{V}{A} \sqrt{\rho}$$

Further, the shape of the plates and their installation is chosen such that the factor R is between 0.025 and 0.6 wherein R = L/(A·F)
L = solvent flowrate (gpm)
F = packing surface area per unit volume of packing (ft²/ft³)
A = column cross-sectional area (ft²)

For co-current contact, the column cross-sectional area A is chosen such that the superficial gas velocity W is between 10 and 100 feet per second where W = V/A (ft/s)
V = gas flow rate (ft³/s)
A = column cross-sectional area (ft²)

In this case, the shape of the plates and their installation is chosen such that the factor R (as above) is between 0.4 and 7.

The solvent which is used may be in any suitable concentration for the process. For example, where the solvent is an aqueous solution of methyl-diethanolamine, the concentration may be between 8 and 60 weight percent.

Further, the process may be carried out at a pressure which is suitable to the feed gas which is being processed. For example, where the feed gas is a sour natural gas, the pressure at which the feed gas is contacted with the solvent may be between 250 and 1500 psia. Where the feed gas is an acid gas, the pressure may be between 12 and 30 psia.

Where the feed gas is sour CO₂, the pressure may be between 12 and 500 psia. Where the feed gas is a Claus plant tail gas, treated to convert sulfur species to hydrogen sulfide, the pressure may be between 12 and 30 psia.

The invention thus provides a process which makes use of the more effective chemical absorbents so that acid gas can be enriched using absorption at low pressure. Using these absorbents, the process achieves the highest possible selectivity so that with almost complete hydrogen sulfide removal, only a minimum of carbon dioxide is co-absorbed.

The invention also provides compact and inexpensive equipment which is simple and wherein the additional piping and valves required can be kept to a minimum.

What is claimed is:

1. A process for absorbing hydrogen sulphide from, a feed gas containing hydrogen sulphide and carbon dioxide, said process comprising the steps of
   contacting the feed gas with a solvent containing an aqueous solution of alkanolamine in an absorption column containing structured packings each including a plurality of parallel corrugated plates having angularly disposed corrugations disposed in criss-crossing relation to a facing corrugated plate whereby the solvent absorbs the hydrogen-sulphide;
   collecting the hydrogen-sulphide loaded solvent; and
   removing the hydrogen-sulphide depleted gas.

2. A process as set forth in claim 1 wherein the feed gas and solvent flow in counter-current relation within the absorption column.

3. A process as set forth in claim 2 wherein the column cross sectional area A in square feet is chosen for a gas flow V in cubic feet per second and a gas density $\rho$ in pounds per cubic foot such that the gas loading factor G is between 0.25 and 3.3, where $$G = \frac{V}{A}\sqrt{\rho}$$

and the shape of the plates and their installation is chosen such that the factor R is between 0.025 and 0.6, where R=L/(A·F)
L=solvent flowrate (gpm)
F=packing surface are a per unit volume of packing (ft$^2$/ft$^3$)
A=column cross sectional area (ft$^2$)

4. A process as set forth in claim 1 wherein the feed gas and solvent flow co-currently through the absorber column.

5. A process as set forth in claim 4 wherein the column cross sectional area A is chosen such that the superficial gas velocity W is between 10 and 100 feet per second, where
W=V/A (ft/s)
V=gas flow rate (ft$^3$/s)
A=column cross sectional area (ft$^2$)
and the shape of the plates and their installation is chosen such that the factor R is between 0.4 and 7, where
R=L/(A·F)
L=solvent flowrate (gpm)
F=packing surface area per unit volume of packing (ft$^2$/ft$^3$)
A=column cross-sectional area (ft$^2$)

6. A process as set forth in claim 1 wherein the solvent includes an aqueous solution of methyl-diethanolamine in a concentration of between 8 and 60 weight percent.

7. A process as set forth in claim 1 wherein the feed gas is sour natural gas and is contacted with the solvent at a pressure between 250 and 1500 psia.

8. A process as set forth in claim 1 wherein the feed gas is an acid gas and is contacted with the solvent at a pressure between 12 and 30 psia.

9. A process as set forth in claim 1 wherein the feed gas is sour $CO_2$ and is contacted with the solvent at a pressure between 12 and 500 psia.

10. A process as set forth in claim 1 wherein the feed gas is a Claus plant tail gas, treated to convert sulfur species to hydrogen sulfide and is contacted with the solvent at a pressure between 12 and 30 psia.

* * * * *

UNITED STATES PATENT AND TRADEMARK OFFICE
CERTIFICATE OF CORRECTION

PATENT NO.  : 4,678,648
DATED       : July 7, 1987
INVENTOR(S) : NICHOLAS P. WYNN It is certified that error appears in the above-identified patent and that said Letters Patent is hereby corrected as shown below:

Column 5, line 12 "methlydie-" should be -- methyldie- --
Column 6, line 15 "function" should be -fraction-
Column 9, line 16 "are a" should be -area- Signed and Sealed this Twelfth Day of January, 1988

Attest:

DONALD J. QUIGG

*Attesting Officer*    *Commissioner of Patents and Trademarks*